United States Patent Office

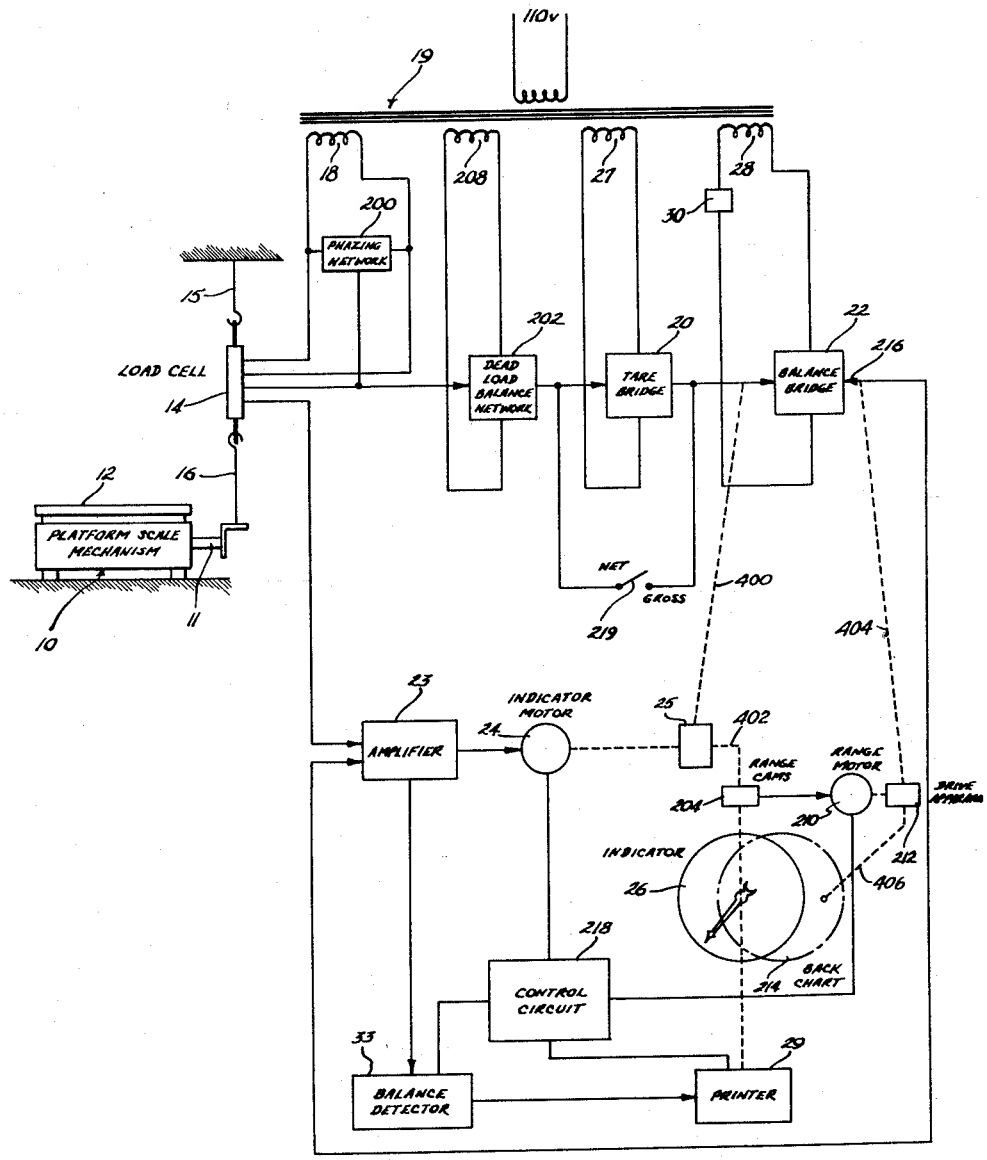

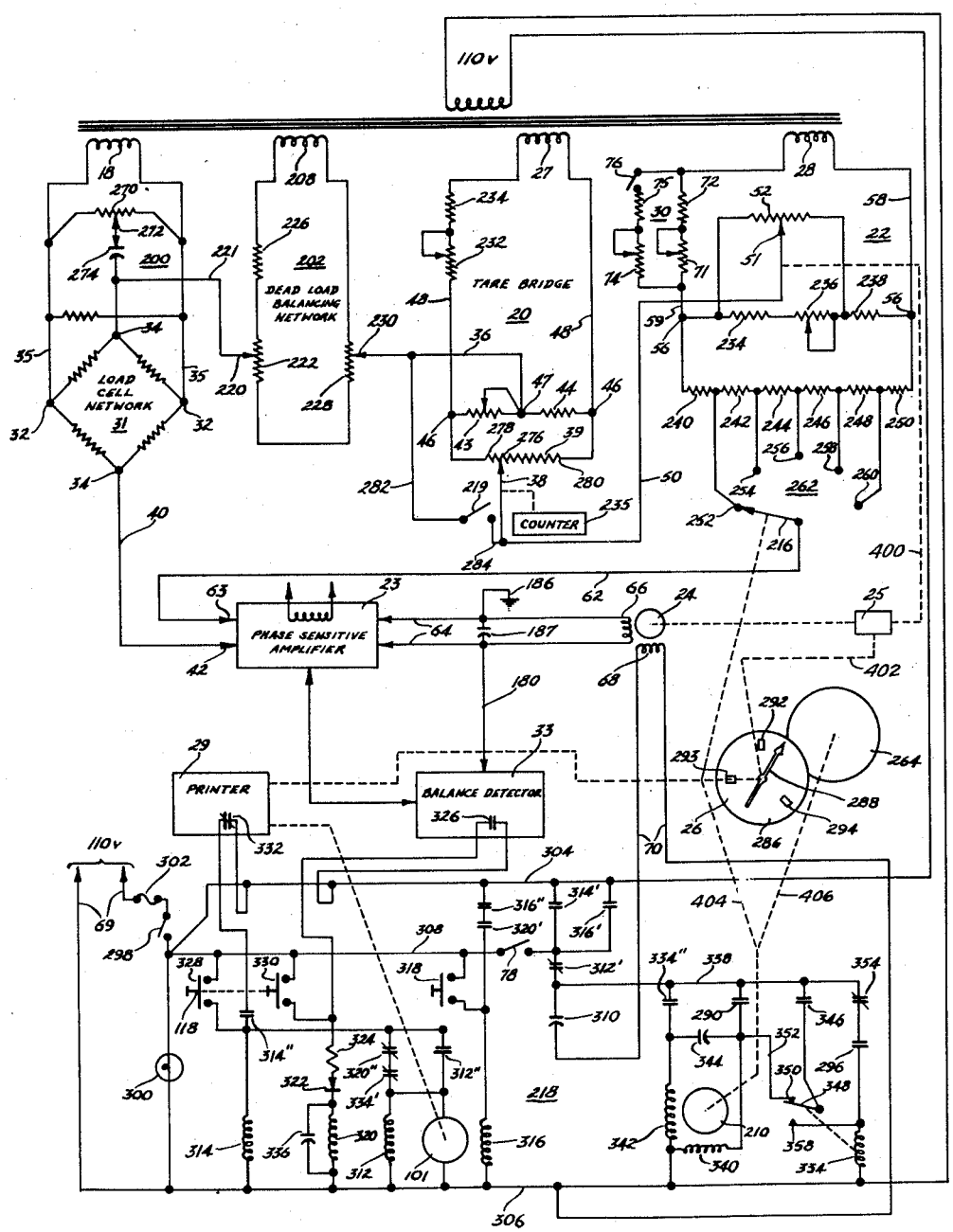

2,931,639
Patented Apr. 5, 1960

2,931,639

WEIGHING SCALE SYSTEM

Louis J. Lauler, Rock Island, and Matthew T. Thorsson, Moline, Ill., assignors to Fairbanks, Morse & Co., Chicago, Ill., a corporation of Illinois Application October 8, 1953, Serial No. 384,986

6 Claims. (Cl. 265—70)

This invention relates to weighing scales, and more particularly to a weighing scale organization embodying an electrical system for sensing scale loading and effecting weight indication and recording of scale loads. The instant application is a continuation-in-part of our copending application entitled "Weighing Scale System," filed November 30, 1951, Serial No. 259,148, issued as Patent No. 2,766,981 on October 16, 1956 and our copending application entitled "Weighing Scale System With Weight Recorder, filed February 21, 1952, Serial No. 274,166, now Patent No. 2,882,035, issued April 14, 1959.

In general, the weighing scale organization described and shown in the above mentioned copending applications includes load support means, which for example, may be a scale platform and lever system of any well known type, and load cell means coupled to the load support means for sensing the loading of the support. The load cell means employed is of known construction, providing an electrical network normally balanced under zero strain condition of the cell means, and producing an output voltage the magnitude and phase direction of which are directly dependent upon the extent and direction of unbalance of the network as determined by the load sensing function of the cell means by the application of load to and load removal from the scale load support means. The load cell means which in load sensing unbalance of its network produces an output voltage proportional to the weight of the scale loading, is included in the electrical system to function as the activating agency in such system. The electrical system embodies in addition to the cell means, a tare bridge network, a regulated balance bridge network including a balancing potentiometer, phase sensitive amplifier, a reversible motor in operative connection to the balancing potentiometer and to weight indicator and recorder means, and control provisions effective for preventing weight-recording operation of the recorder means until the electrical system attains a stable balanced condition in its scale load sensing function.

In the scale organization generally outlined above, the cell means frequently is subjected to a strain representative of a gross load, i.e. a tare load and a net load, which results in a cell network output voltage proportional to the gross load. Such cell voltage representative of the gross weight may be reduced by the tare bridge network, which is made adjustable for that purpose, by an amount equal to the tare load so that the part of the cell voltage representative of the tare weight will not interfere with the normal weight sensing and indicating function of the system in respect to all loads to be measured, but only that part of the voltage representative of net load will effect a weight indication. Once the tare bridge adjustment is made, application of load to the support means will unbalance the cell network to activate the electrical system, the net cell output voltage (in the range above the initial cell voltage cancelled out by the tare bridge network) then being applied to the balance bridge network and causing through the amplifier means, operation of the motor in the proper direction such that it actuates the balancing potentiometer in the direction to produce an opposing voltage in the balance bridge network and balance out the net cell output voltage, whereupon the motor stops. Any decrease in the load under measurement or its removal from the support, will effect corresponding decrease in the net cell output voltage with resultant unbalance of voltage in the balance bridge network in the opposite direction, and consequent reverse operation of the motor to actuate the potentiometer in the opposite direction until the balance bridge once again provides an opposing voltage equal to the new net cell output voltage valve. In all cases the extent of motor operation in either direction is a definite function of the magnitude of the net cell output voltage, while the net cell voltage is directly proportional to the weight of the load to be measured. Therefore, the extent of motor operation is proportional to the weight of the load to be measured, so that the motor affords a ready instrumentality for operating suitable weight indicator means and for properly conditioning recorder means to provide weight recording or printing of scale load weights.

Moreover, through regulation of the balancing characteristics of the balance bridge network, the extent of motor operation may be related to the weight of the scale load to be measured, by a definite ratio predetermined such that the motor in operating through reduction gear means selected in accordance with said ratio, will operate the indicator means to provide weight readings of the scale load weight in terms of units of a given weight measuring system, as pounds for example, and concurrently therewith condition the recorder means for recording or printing the scale load weight in terms of the same units. The system may be readily adapted for indicating and recording scale load weights selectively in terms of units of any one of several different measuring systems.

The electrical system embodies in addition, an energization control provision for the reversible motor, which is operable selectively to condition the motor for operation in response to load cell sensing of scale loads, or to prevent motor operation. By this provision the motor, when operated to set-up a weight indication on the indicator means and to condition the recorder for weight printing, may be held in its operative position, holding the weight indication, while another similar weight is applied to the weighing mechanism, and then the motor may be reconditioned for operation to indicate the new weight without requiring return of the motor to its initial position representative of zero scale load, whereby to reduce the time element in weight indications where a group of nearly similar weights are to be measured.

The above described features and arrangement of the weighing scale system are shown and described in one or the other or both of the aforementioned copending applications. The instant application is particularly concerned with and related to improvements and modifications in and additions to this weighing scale system.

An important feature of the present invention resides in the provision of a capacity range changing mechanism, which automatically conditions the electrical system of the scale mechanism for balance in any of several weight ranges. By providing a range changing mechanism, the total capacity of the scale may be sub-divided into several sections, each section covering a portion of the total scale capacity, so that the size of the indicator or chart may be materially reduced and the mechanical and electrical arrangements of parts greatly simplified, while permitting a more accurate indication of weight.

In our weighing scale system, the range changing mechanism is constructed and arranged to prohibit a weight indication until the scale has come to balance in the proper range for a given load. Also, the scale cannot come to balance and printing cannot be effected, when the indicator is disposed within the "chord space," i.e. the portion of the front chart between the largest graduation on the chart and the zero mark, to give an erroneous reading. The range changing mechanism automatically places the scale in condition to weigh in another range, when the scale load is of a sufficient magnitude and when the indicator enters the chord space.

Another object of the invention is the provision of circuit means for eliminating quadrature voltages, created by inter-element impedance or from other causes, that may adversely affect the operation of the weighing scale. Thus voltages that are angularly displaced relative to the primary or signal voltage are cancelled by what may be termed a phasing network. Hence, in scale installations where the weight indicating mechanism is located an appreciable distance from the load cell, the quadrature voltage attributable to the capacitance of the interconnecting cable may be cancelled by adjusting the phasing network.

It is another object of this invention to provide a balancing network for cancelling the output voltage of the load cell produced by "dead load." For example, in the scale mechanism described herein, the load cell may be under an initial strain due to the "dead" weight of the scale platform and associated lever mechanism carried by the load cell. It is desirable to eliminate such "dead load" signals in a separate balancing network rather than in the tare bridge, so that the entire range of the tare bridge is available to balance-off true tare weights such as the weight of containers or trucks. This balancing network includes a coarse adjustment and a fine adjustment. The scale may be initially balanced by the coarse and fine adjustments to cancel the output voltage of the cell representative of the constant dead load attributable to the scale mechanism itself, and rebalanced in operation from time to time by the fine adjustment to compensate for variations in weight due to the accumulation of dirt, ice, snow, etc. on the platform.

Another object of the invention is the provision of novel tare and balance bridges. Both bridges include a potentiometer, and are constructed and arranged to prevent variable energization of the bridges from adversely affecting the electrical positioning of the potentiometer contacts with respect to their signal voltage cancelling function.

Still another object of the invention is to provide means for selectively rendering the tare bridge effective or ineffective, whereby the net weight or gross weight, respectively, of the scale load may be indicated.

Another feature of the invention is the provision of novel tare and balance bridges, which may utilize a potentiometer having the mechanical zero position of the movable contact spaced from the electrical zero position. Yet, the tare bridge may be rendered ineffective in its function of subtracting tare voltages from the signal voltage to permit "gross" weight indication without introducing error in the weight indication.

An important object of this invention is to provide an electro-mechanical control circuit for the weight indicator mechanism, capacity range changing apparatus, and weight recording equipment. The control circuit gives complete operational control over the weighing system. A printed record of the load may be produced and/or the electrical system brought to balance by momentarily actuating a switch. Printer operation is automatically controlled to prevent an inaccurate recorded weight and to prevent operation of the printer when an unbalanced condition exists or only a momentary balance is achieved.

The aforementioned objects, advantages, and features of the invention as well as many others, will become more readily apparent as the description proceeds and is read in conjunction with the accompanying drawings, wherein:

Fig. 1 illustrates diagrammatically, the weighing scale organization, including a platform scale and apparatus in operative association therewith for sensing scale loading and producing weight indications and printed records of scale loads.

Fig. 2 is a schematic diagram of the electrical circuit arrangement for the weighing scale organization shown in Fig. 1.

Referring to the drawings and first to Fig. 1 thereof, the electrical system for sensing and producing weight indications of scale loads is shown, by way of example, in operative association with a load support or platform scale mechanism generally indicated at 10. Such mechanism may be of the usual or well known platform and lever construction, providing an output lever 11 movable in response to loading and unloading of the scale platform 12. In place of the usual mechanical balance beam provision operated from the output lever 11 as through a steelyard connection, is a single strain gage load cell device 14. The load cell 14 is of known construction, and is supported from a fixed support 15 and coupled to the scale output lever 11 as at 16, so that its strain responsive load cell element is directly subject to displacement of the lever 11 consequent to loading and unloading of the scale platform 12. As is known, the load cell 14 embodies an electrical network having an input circuit supplied from a constant voltage source such as the secondary winding 18 of an alternating current supply transformer 19, and an output circuit providing an output potential the magnitude and phase direction of which are dependent upon the extent and direction of unbalance of the cell network consequent to cell reaction to the loading and unloading of the scale mechanism. Although an alternating current source of input to the cell network is here shown in the preferred example of the invention, where it is desired a suitable source of unidirectional voltage may be employed to supply the cell network input. When an alternating current supply is used, a phasing network 200 is provided for use in nullifying quadrature voltages produced in the electrical circuit.

The cell output voltage is transferred through a dead load balancing network 202, a tare bridge network 20, a balance bridge network 22, and a suitable phase sensitive electronic amplifier 23, to the control field portion (see Fig. 2) of a reversible motor 24. Motor 24 serves, through suitable reduction gearing 25, to operate a network rebalancing device embodied in the balance bridge 22, range cams indicated at 204, a weight indicator device such as a dial indicator 26, and in conjunction with operation of the indicator 26 to condition printer mechanism 29 for weight recording or printing. The device 33 represents the scale balance detector, which affects the printer 29 as will be described presently.

The input circuit of tare bridge 20 is supplied from a fixed source, as the transformer secondary winding 27, while the input of balance bridge 22 is supplied from secondary winding 28 of transformer 19 through an electrical control 30 of a nature and serving a purpose to appear. Dead load balancing network 202 is energized by secondary winding 208 of transformer 19.

A range changing mechanism is operatively associated with range cams 204, and includes an electric motor 210, hereinafter called the range motor, connected through drive apparatus 212 to back chart 214 and switch blade 216 forming a part of the balance bridge 22.

A control circuit 218 is connected with drive motor 24, balance detector 33, printer 29, and range motor 210 to provide complete operational control of the electrical weighing scale. A shorting or shunting switch 219 is provided around the tare bridge. The weight sensing and weight indicating and recording function of the electrical system together with the purpose and function of the tare and balance bridge networks, phasing network, dead load balance network, control circuit, and the range changing mechanism, will appear from the following description of the electrical circuit portion of the system shown in greater detail by Fig. 2.

In Fig. 2, the electrical network of the load cell 14 is shown in the form of a Wheatstone bridge generally indicated by the numeral 31, having input terminals 32 and output terminals 34. The bridge input terminals 32 are connected through leads 35 to the voltage source provided by secondary winding 18 of the supply transformer 19, supplying a predetermined fixed voltage at the network input terminals. It may be noted here that the load cell 14 is selected such that its load responsive capacity corresponds to the load capacity of the associated platform scale mechanism 10 illustrated in Fig. 1.

One output terminal 34 of the cell network is connected by a lead 221 to the movable contact 220 of a coarse adjusting potentiometer 222 in the dead load balancing network 202, while the opposite output terminal 34 of the cell network is connected by lead 40 to one input terminal 42 of a suitable phase sensitive electronic amplifier 23. In network 202 a fixed resistor 226, coarse adjusting potentiometer 222, fine adjusting potentiometer 228, and secondary transformer winding 208 are connected in series. The slide 230 of fine adjusting potentiometer 228 is connected by lead 36 to terminal 47 of tare bridge 20 between resistors 43 and 44, each such resistor forming a leg of the tare bridge. The remaining or complementary legs of the tare bridge are provided by potentiometer 39, having a movable contact 38, which is the output terminal of the bridge. The input terminals 46 are connected through a circuit 48 to the series arrangement of transformer winding 27, span adjusting rheostat 232, and fixed resistor 234, whereby transformer winding 27 serves to energize the tare bridge as will hereinafter be described.

A circuit lead 50 connects the movable contact 38 of the tare bridge to a movable element 51 of potentiometer 52 forming part of the balance bridge 22. Potentiometer 52 is parallel by the series combination of a fixed resistor 234 and a range adjusting resistor 236, and the parallel combination is arranged in series with resistor 238 between the bridge input terminals 56, supplied through conductors 58 and 59 with an input voltage derived from the transformer secondary winding 28. It is to be noted that conductor 59 includes resistance means forming the control 30 as indicated in Fig. 2. The other portion of the balance bridge circuit is constituted by a plurality of resistors 240, 242, 244, 246, 248 and 250 connected in series between energizing conductors 58 and 59, of which resistors 240 and 250 are compensating resistors, and resistors 242, 244, 246, and 248 are range resistors. The terminals of the range resistors are connected to the fixed contacts 252, 254, 256, 258 and 260 of a range switch 262 having a rotationally operative switch blade 216 (Figs. 1 and 2), which serves as the output terminal of the load balance bridge. Switch blade 216 is mechanically positioned by range motor 210 in the manner hereinafter explained, to engage one of the contacts 252, 254, 256, 258 or 260, dependent upon the load placed on the scale mechanism effective in establishing a given load cell output voltage, to provide a predetermined voltage in balancing opposition to the load cell voltage. Movable contact 51 of potentiometer 52 is then able to bring the load balance bridge into balance by reducing the output voltage at switch blade 216 to zero.

Switch blade 216 is connected by lead 62 with the remaining input terminal 63 of amplifier 23. The output of the amplifier is connected by the circuit 64 to control field winding 66 of reversible motor 24. The motor 24, which may be of a well known two-phase type, includes a main field winding 68 energized from a suitable fixed voltage source such as a 110 volt, 60 cycle source 69 to which the winding is connected by circuit 70 through manual switch 78 and contact 312', both of which form part of the control circuit 218 to be described presently. Motor 24 serves through a reduction gear mechanism diagrammatically indicated at 25, to operate the movable element 51 of the balance bridge potentiometer 52, at the same time to operate weight indicator 26, which is here shown by way of example only, to be of a dial type, and to condition the printer mechanism 29 for weight printing. Reduction gear mechanism 25 also controls certain switches forming a part of the control circuit 218 for energizing or de-energizing range motor 210, which in turn positions back chart 264, switch blade 216, and conditions printer 29 for printing in accordance with the scale load that is to be indicated, thereby to automatically permit weight indication in the weight capacity range of the scale including the particular weight of the scale load.

As is known in connection with load cells of the character indicated, the cell network output is at substantially zero voltage under the condition of zero load-strain of the cell. In the present application of the load cell to a load support such as the indicated platform mechanism (Fig. 1), the cell may be under an initial strain due to the dead weight of the scale platform and associated lever mechanism including the output lever 11. In a system of the character under consideration, it is desirable to eliminate the initial output voltage created by dead weight from any effect upon the electrical system in its load weight indicating function. This is accomplished by balancing out such voltages through the dead load balancing network. To that end, the dead load balancing network is constructed and arranged to provide an opposing voltage, capable of adjustment to a magnitude equal to the dead load output voltage of the load cell network, so that the initial cell voltage representative of the dead load will be effectively cancelled.

In various weighing operations a portion of the load on the weighing scale mechanism may constitute a tare weight. For example, a substance may be loaded into a container placed on the scale platform, and only the weight of the substance and not the container, which is a tare load, is to be indicated. Since the load cell is stressed by the entire or gross load on the platform to produce an output voltage of a magnitude proportional to the gross load, it is desirable to eliminate that part of the output voltage representative of the tare weight from affecting the electrical system in producing weight indication. For this purpose the balancing characteristics of tare bridge 20 and the bridge input voltage from the transformer secondary winding 27, are predetermined with respect to the cell output voltage as it may be increased by tare weights imposed on the scale platform, so that upon adjustment of the tare bridge potentiometer 39, that portion of the cell output voltage representative of tare weights will be effectively cancelled. Consequently, the cell voltage effective in the system beyond the tare bridge, will be that portion of the cell output voltage which is directly representative of the load to be measured, i.e. the net load.

In the absence of a load to be measured on the scale platform 12, the net output voltage of the tare bridge will be zero since the initial cell voltage due to the tare weight and dead weights of the scale mechanism is cancelled out through the dead load balancing network 202 and tare bridge 20. Under this condition, the motor 24 is set to position the movable element 51 of the balance bridge potentiometer 52 such that the bridge is in balance with zero voltage appearing between the input terminals 42 and 63 of amplifier 23.

Now upon application of a load to be measured by the scale mechanism, the load cell network will develop an additional voltage in one phase direction and of a magnitude which is proportional to the weight of the imposed load. This voltage, hereinafter referred to as the net cell output voltage, is transmitted through the dead load balance network and tare bridge and the balance bridge 22, to provide a resultant voltage at the amplifier input terminals 42 and 63, which voltage then is amplified and appears in the output circuit 64 as a control voltage. Such control voltage, which may be hereinafter referred to as the unbalanced voltage of the scale system, is applied by a circuit 64 to the motor control winding 66, to cause motor operation (assuming the main motor winding 68 to be energized) in one direction such as to move the element 51 of the potentiometer 52 in a direction to effect an unbalance of the balance bridge 22. As element 51 is moved to a new position, the unbalanced voltage of the scale system applied to motor winding 66 gradually diminishes. When bridge 22 provides an opposed voltage equal to the net cell output voltage, the motor 24 stops because of the absence of a resultant input voltage to the amplifier at such time, with consequent zero unbalance voltage at the motor control field 66.

When the load on the scale platform is removed in part or entirely, the net cell output voltage is reduced proportionately. The opposing voltage provided by balance bridge 22 and the net cell output voltage becomes correspondingly unbalanced, but in the opposite direction, so that motor 24 in response to the changed unbalanced voltage, operates the movable element 51 of the potentiometer 52 in the opposite direction to decrease the opposing voltage provided by bridge 22, until the opposing voltage and net cell output voltage are balanced at which time the motor again stops. It will presently appear that in all cases, the extent of operation of the reversible motor 24, as well as the displacement of switch blade 216, relative to their initial bridge balancing condition with no load on the scale platform, is representative of the weight of the scale load to be measured. Therefore, motors 24 and 210 may be utilized to operate a suitable weight indicating device such as the scale indicator 26.

As described in detail in our copending application Serial No. 259,148, filed November 30, 1951, the control instrumentality 30 associated with balance bridge 22 is adapted and arranged to variably energize the balance bridge from secondary winding 28 of transformer 19. With this arrangement, the present system may be calibrated for providing weight indications in terms of pounds or in units of any other measuring system.

For this purpose, control 30 provides a first resistance circuit having an adjustable resistance 71 and a fixed resistance 72 in series with the supply conductor 59 and being selectively parallel with the series arrangement of an adjustable resistance 74, fixed resistor 75, by operating a switch 76. Closure of switch 76 connects the resistance elements 74 and 75 in parallel with elements 71 and 72 to alter the magnitude of the voltage drop across balance bridge 22. As described in said copending application (Serial No. 259,148), the system may be adapted to indicate a scale load in terms of pounds when switch 76 is open, and adapted to indicate the weight in terms of some other selected units when the switch is closed. As will be hereinafter explained, adjustable resistances 71 and 74 also cooperate with the balance bridge circuit to provide a "span" adjustment for the balance bridge.

Included in the control circuit 218 is a control switch 78, which in conjunction with other electrical equipment hereinafter explained, controls the energization of the main field winding 68 of motor 24. For the present it is sufficient to note that switch 78 serves as a motor holding control. By opening switch 78, motor 24 is de-energized to retain a weight reading on indicator 26, even while the load is removed from the scale platform and while other loads are placed thereon. When switch 78 is closed, motor 24 is energized so that the indicator will be operated to bring the system to a position of balance representative of the load then on the scale platform.

In accordance with the teachings of our copending application Serial No. 274,166, filed February 21, 1952, a printer mechanism, which may be of the character shown in Hadley et al., Patent No. 2,070,011, is operatively associated with indicator 26 and has appropriate type sectors that are positioned by indicator 26. When a printed record is to be produced, recorder or printer motor 101 is energized by closing a print switch 118. Motor 101 and switch 118 form a part of the control circuit 218, the function of which will hereinafter appear. But for the present it should be appreciated that various other elements in the control circuit affect the operation of the printer.

Operation of the printer 29 is prevented, until the scale system attains a balance, by balance detector 33. The balance detector, which is shown in detail in our said copending application Serial No. 274,166, is connected to one lead of the output circuit 64 of amplifier 23. The other lead of circuit 64 is grounded at 186, while bridging the circuit 64 is a condenser 187. Thus the balance detector is adapted to sense the presence or absence of an unbalance voltage in circuit 64.

When an unbalance voltage of either phase is present in circuit 64, balance detector 33 maintains printer motor 101 inoperative, to prevent printer operation. When the unbalance voltage in circuit 64 becomes zero, indicative of exact scale balance either in loaded or unloaded condition, the balancing detector renders the motor energizing circuit of motor 101 capable of independent energization, so that the printer may be operated. The balance detector controls the printer 29 through the control circuit 218, and the precise manner of control will be hereinafter discussed.

A brief description of the operation of the scale mechanism will serve, at this time, to emphasize the various features of the present invention. Load cell network 31 provides an output voltage proportional to the entire load carried thereby. This voltage is reduced by the dead load balancing network 202 and tare bridge 20 to provide an input voltage to amplifier 23 representative of the net load. The output signal of the amplifier causes motor 24 to operate and position indicator 26, operate printer 29, actuate the range changing mechanism, and move element 51 of the balance bridge potentiometer. Motor 24 continues to operate until balance bridge 22 has reduced the amplifier input voltage to zero value. Indicator 26 then shows the correct net weight and a printed record then may be produced.

An important feature of the invention resides in the provision of phasing network 200. A voltage dividing resistor 270, having a movable tap 272, is connected across secondary winding 18. A capacitor 274 is connected between tap 272 and lead 221 which serves to impress the cell output voltage on the remainder of the circuit. Due to the inter-element impedance of the load cell components, the load cell connecting wires and to other causes an undesirable output voltage frequently is produced at the output terminals of the load cell cable. This unwanted voltage is angularly displaced (out of phase) from the cell output voltage due to the stressing of the cell. The magnitude of this spurious voltage will vary with the type of load cell, length of connecting leads, and other conditions, and is a quadrature voltage, i.e. is 90° out of phase with the load cell signal voltages. While indicator motor 24, which is of the two phase type, will not respond to these quadrature voltages, the presence of such voltages may seriously affect the operation of the electrical system. Particularly, the amplifier 23 may be saturated or the operation of balance detector 33 adversely affected.

Resistor 270 and capacitor 274 are adapted to provide a quadrature voltage in phase opposition to the spurious voltage. By adjusting the position of tap 272, the magnitude of the quadrature voltage produced by the phasing network, may be increased or decreased until the quadrature voltage appearing between output terminals 34 of the load cell is cancelled. Thus only the load cell voltage representative of the actual load, will be present in the remainder of the electrical circuit.

While the phasing network 200 has been shown as applied directly to the load cell, it should be readily appreciated that the spurious quadrature voltage may be effectively cancelled in other portions of the circuit. Also any voltages which are spaced other than 90° from the load cell signal voltage may be effectively cancelled by the provision of a balancing network capable of producing voltages in phase opposition to the undesirable voltages.

In various weighing systems where the load cell may be used, the cell is frequently under an initial strain due to the dead weight of the various scale elements. For example (referring to Fig. 1) it may be impossible to "back balance" or "counter-balance" the dead load of platform 12 on output lever 11, and therefore load cell 14 will be stressed a certain amount. On the other hand, even if it were possible to perfectly balance lever 11 so that no initial strain is imposed on cell 14, a dead load might be imposed on the cell by the accumulation of foreign substances on the scale platform. Furthermore, the dead load imposed on the load cell may vary from one installation to another.

Since the cell output voltage is proportional to the amount of stress exerted on the load cell, the voltage appearing between leads 40 and 221 will include a dead load voltage. The purpose and function of the dead load balancing network 202 is to reduce the magnitude of the cell output voltage by an amount equal to the dead load voltage. Secondary winding 208 of transformer 19 produces current flow through resistor 226, coarse adjusting potentiometer 222 and fine adjusting potentiometer 228. The connections of transformer 208 are such that potentiometers 222 and 228 have a voltage drop produced thereacross in phase opposition to the cell output voltage. Thus as viewed in Fig. 2, when movable contact 220 or 230 is moved upwardly, the cell voltage supplied to the tare bridge will be reduced a greater amount, and conversely, when these contacts are moved downwardly, the cell output voltage will be reduced a lesser amount.

In ordinary operation the amount of dead load voltage will be largely dependent upon the weight of the scale mechanism supported by the load cell, and this voltage is balanced out by adjusting contact 220 of coarse adjusting potentiometer 222, until zero voltage appears at contact 230 with no load on the scale. If the dead load voltage should vary during use of the scale because of dirt, ice, snow, etc., that may collect on the platform, or for any other reason, movable contact 230 of fine adjusting potentiometer 228 may be repositioned to nullify the effect of the increased dead load voltage.

In our copending applications, of which this application is a continuation-in-part, the function of dead load balancing network 202 was accomplished in the tare bridge. By providing a separate dead load balancing network and a tare bridge which reduces the cell output voltage by an amount representative only of the tare voltage, an important improvement is obtained. With this arrangement the tare bridge may be rendered effective or ineffective to enable the scale mechanism to indicate net or gross weight, respectively. This feature will be more fully explained in the following description of the tare bridge.

The primary function of tare bridge 20 is to cancel the effect of any voltage created by a portion of the load to be considered as "tare." For example, the weight of a barrel or other container, truck, etc., would be tare weights when only their contents were to be weighed. Resistors 43 and 44 and potentiometer 39 are connected as a Wheatstone bridge which is energized from transformer winding 27 through resistor 234 and adjustable resistor 232. When the Wheatstone bridge is in balance, no voltage produced by transformer winding 27 is developed between terminal 47 and contact 38. Thus, in this condition any cell output voltage appearing at terminal 47 will also appear at contact 38. By moving contact 38 to produce a voltage in phase opposition to the cell voltage between terminal 47 and contact 38, the potential of the contact, with reference to input terminal 42 of the amplifier 23, is reduced. In other words, the tare bridge may reduce the cell output voltage a predetermined amount, which amount is dependent upon the position of contact 38.

As indicated in our copending application Ser. No. 274,166, filed February 21, 1952, movable contact 38 may be mechanically connected to a Veeder-Root counter 235 (Fig. 2) so that the amount of tare weight may be read on the counter. In order to permit this type of operation and in view of certain other considerations, it is necessary that a given incremental movement of contact 38 over potentiometer 39 increase or decrease, as the case may be, the cell output voltage by a fixed amount regardless of which portion of the potentiometer the contact is moved across. For example, moving contact 38 .1 of an inch along any part of potentiometer 39 must increase or decrease the cell output voltage an equal amount. In order to meet this stringent requirement and certain other requirements, potentiometer 39 may be constructed so that at the "zero" mechanical stop of contact 38, there is a certain amount of resistance remaining beyond the zero position. This small amount of resistance is represented between points 276 and 278 of potentiometer 39. Point 276 is the zero position of contact 38, that is, the tare bridge is not providing a voltage in opposition to the cell voltage.

By varying the resistance of adjustable resistor 43 until it equals the resistance of potentiometer 39 between points 276 and 278, and by selecting resistor 44 equal in resistance to that part of potentiometer 39 between points 276 and 280, the zero position of slider 38 is rendered entirely independent of the energizing voltage of the bridge as determined by resistors 232 and 234. Thus with no input signal from the load cell, the voltage between terminal 47 and contact 38, disposed at point 276, will be zero regardless of the amount of energizing voltage supplied to the bridge. Also in this condition any cell output voltage present at terminal 47 will also appear unimpeded in value, at contact 38.

By moving contact 38 from point 276 toward point 280 the cell voltage on contact 38 may be reduced. As previously mentioned, a given increment of movement of contact 38 must reduce the cell output voltage an exact amount, which is representative of the tare voltage. This correlation between cell output voltage and the tare bridge is accomplished by adjusting the "span" of potentiometer 39. By putting a known test load on the scale platform and moving contact 38 until the Veeder-Root counter reads the test load value, the voltage appearing at contact 38 should be zero. If this voltage is not zero, transformer winding 27 is supplying too large or too small of a voltage to the Wheatstone bridge. By changing the effective value of adjustable resistor 232, the voltage drop across the Wheatstone bridge can be increased or decreased until the voltage output appearing at contact 38 is zero. It is important to again note that the adjustment of resistor 232 does not alter the electrical zero position of contact 38. After this span adjustment, tare bridge 20 reduces the cell output voltage in exact accordance with the amount of tare weight.

Another important feature of our invention is the provision of electrical circuit means for rendering the tare bridge ineffective in order to allow the gross cell voltage to pass directly to balance bridge network 22. When the tare bridge is effective in reducing the cell voltage by the amount of tare voltage, the net weight will appear at the indicator, and when the bridge is ineffective gross weight will be indicated.

The Wheatstone bridge network allows the tare bridge to be shorted without affecting the electrical characteristics of the other circuit portions. As explained above, when contact 38 is in its zero position there is no difference in potential between terminal 47 and contact 38 regardless of what load cell voltage is fed to the tare bridge. Therefore, a short may be made between terminal 47 and contact 38 without affecting the load cell signal voltage. Also when a cell output voltage representative of a gross weight is supplied to terminal 47, and contact 38 is positioned to reduce the total cell output voltage until only a voltage representative of net weight appears on the contact, the tare bridge may be shorted out with no adverse effect. The shorting of the tare bridge is accomplished by switch 219 connected between terminal 47 and contact 38 by leads 282 and 284. Thus under any condition, switch 219 may be closed to pass the gross cell output voltage around tare bridge 20.

In the weighing scale system of our copending applications, of which this application is a continuation-in-part, the balancing potentiometer independently serves to bring the balance bridge into a balanced electrical condition. Also, all the indicia of the entire weighing capacity of the scale was disposed on a single indicator or chart. Thus these scale systems had but a single range of weighing capacity. In the weighing scale system of the present invention, the weighing capacity of the scale is divided into ranges. This is accomplished by the novel range changing mechanism and balance bridge arrangement now to be described. The operation, function, and construction of the balance bridge and range changing mechanism may be best understood by explaining, as an example, a scale which is to have a total weight capacity of 100,000 pounds. Assume further that front chart 286 of indicator 26 is to be graduated in 50 lb. increments, and five ranges of 20,000 lbs. each are to be provided. As will presently appear, it is expedient to provide an overlap of the ranges whereby the first range overlaps the second range and the second overlaps the third, etc. For the present it will be assumed that there is an overlap of 5,000 lbs. between adjacent ranges.

The first range is represented by the indicia on front chart 286 and has a total capacity of from 0 to 25,000 lbs. Since the scale is to be calibrated in 50 lb. units, dividing 25,000 lbs. by 50 lbs. indicates that 500 graduations are required on front chart 286. The other ranges in order extend from 20,000 to 45,000 lbs., 40,000 to 65,000 lbs., 60,000 to 85,000 lbs., and 80,000 to 105,000 lbs.

For the present it is to be understood that the scale weighing range will change from the first to the second range after the indicator passes 20,000 lbs., from the second to the third after the indicator passes 40,000 lbs., from the third to fourth after the indicator passes 60,000 lbs., etc. Thus, whenever the load cell voltage is of a magnitude less than the voltage required to displace the pointer 288 over 400 graduations (20,000 lbs.), the movable contact 51 of potentiometer 52 will be driven (by motor 24), through a mechanical connection indicated by the numeral 400, to a position where the balance bridge reduces the effective cell output voltage to zero. At the same time, motor 24 operates pointer 288, via a drive connection indicated at 402, to provide a weight reading on front chart 286. When a load cell voltage greater than 400 graduations (20,000 lbs.) is applied to the balance bridge, motor 24 drives movable contact 51 and pointer 288 near the upper end of their paths of movement.

But, between 400 and 500 graduations on the front chart, a "ranges-on" switch 290 of the control circuit 218 is closed to energize range motor 210. The range motor through drive connection 404 drives switch blade 216 of range switch 262 from contact 252 to contact 254 and thereby effectively introduces range resistor 242 into the circuit, and at the same time drives back chart 264 via drive connection 406 so that appropriate numerals are disposed within windows 292, 293 and 294 to indicate weight in the range of from 20,000 to 45,000 lbs. In the present example the resistor 242 reduces the load cell voltage by an amount equal to 400 graduations (20,000 lbs.). Thus any voltage above 400 graduations and under 800 graduations (40,000 lbs.) that must be balanced out to permit a weight indication in the second range, is accounted for by potentiometer 51. If after resistor 242 is introduced into the circuit, the load cell voltage is sufficient to retain the pointer 228 near the upper limit of its path, i.e. now between 40,000 and 45,000 lbs., switch 290 will remain closed to energize again, the range motor 210. Motor 210, which is operatively connected to switch blade 216 by means of mechanical connection 404, will move switch blade 216 into engagement with contact 256 and move back chart 264, via connection 406, to enable the indicator to read in the range of from 40,000 to 65,000 lbs. Range resistor 244 is then effective to reduce the cell voltage the equivalent of another 400 graduations. So long as the load cell voltage is sufficient to retain pointer 288 near its upper limit range resistors 246 and 248 will be quickly added in that order, while (back) chart 264 is correspondingly repositioned.

To illustrate, assume that the scale load is 50,000 lbs. (1,000 graduations). Immediately after range resistor 244 is switched into the circuit, contact 51 is disposed to provide an opposing voltage equivalent to approximately 20,000 lbs. and range resistors 242 and 244 provide an opposing voltage of 40,000 lbs. Hence the opposing voltage provided by the balance bridge and range resistors will be greater than the load cell voltage, so that motor 24 will operate in a reverse direction to move contact 51 by means of connection 400 and move pointer 288 by means of connection 402 away from their upper limits. Since "ranges-on" switch 290 is controlled by the position of pointer 288, the switch will be opened when the pointer falls below 60,000 lbs. Therefore, no other range resistors will be added to further unbalance the system. Motor 24 continues to operate until contact 51 is positioned to exactly nullify the load cell voltage and the indicator 26 will then show the proper reading (50,000 lbs.).

From the foregoing it will be evident that the scale mechanism will be automatically conditioned to weigh in the appropriate capacity range. It is equally important that the scale mechanism automatically reduces the weighing range of the scale when load conditions require it. This may be understood by considering the operation when a 50,000 lb. load is removed from the scale platform after the electrical circuit is in balance and the weight indicated. At balance, range resistors 242 and 244 are then effective to reduce the load cell voltage, contact 51 will be positioned near the center of potentiometer 52, pointer 288 will be positioned 200 graduations from its zero position to read 50,000 lbs., and the back chart will have been positionally indexed to give readings in the third range. At the instant the load is removed, the load cell voltage is reduced to zero as it appears at the input of balance bridge 22, and range resistors 242 and 244 and potentiometer 52 will provide a motor reversing voltage, representative of 50,000 lbs. to amplifier 23. Thus motor 24 is energized to drive pointer 288 through connection 402 quickly toward its zero position and move contact 51 through connection 400 to reduce the unbalance voltage. When contact 51 and indicator 288 reach their zero positions, the only unbalance voltage fed to motor 24 will stem from range resistors 242 and 244, and be equivalent to 40,000 lbs.

At the zero position of pointer 288 a range-off switch 296 in control circuit 218 will be closed to energize range motor 210 in a reverse direction. Thus motor 210 moves switch blade 216 of range switch 262 from contact 256 and cuts out range resistor 244. At the same time (back) chart 264 is indexed one step to reduce the indicator reading range. Cutting out range resistor 244 reduces the unbalance voltage to the equivalent of 20,000 lbs. and this entire voltage will be developed across range resistor 242. The remaining unbalance voltage is also of a phase to retain contact 51 at its zero position, so that switch 296 remains closed. Thus motor 210 remains energized to further move the back chart to indicate in the first range and move switch blade 216 into engagement with contact 252. Therefore, range resistor 242 is rendered ineffective and the electrical system is in balance. While the sequence of returning the scale to zero balance has been described as a step by step operation, it should be understood that all of the range resistors are quickly removed to rapidly rebalance the scale. Furthermore, if only part of the load is removed, the range changing mechanism removes only those range resistors necessary to bring the scale mechanism into the proper weighing range.

The range switches 290 and 296 may be operated by range cams 204 shown in Fig. 1 or by any other convenient mechanism so long as the switches are opened and closed in proper accord with the position of pointer 288 and movable contact 51. The manner in which switches 290 and 296 control the operation of motor 210 will be hereinafter described in conjunction with control circuit 218.

It is to be appreciated that back chart 264 is connected with printer 29, so that the printer is conditioned to print a record of the scale loading in any of the capacity ranges determined by the position of the back chart. As previously mentioned, printer 29 may be of the type shown in Hadley et al. Patent No. 2,070,011, which shows apparatus for recording the weight in ranges above the capacity of the front chart.

Focusing on the balance bridge and range resistor arrangement shown in Fig. 2, it will be noted that potentiometer 52 is connected in parallel with resistors 234 and 236. This parallel network is connected across energizing leads 58 and 59 in series with resistor 238. Thus current from winding 28 will flow through all of these resistors and produce voltage drops thereacross. The total voltage drop across potentiometer 52 must be equal to the effective load cell voltage representative of the largest graduation on the primary chart. Hence, in the example previously selected where the first range extended from 0 to 25,000 lbs., the total voltage drop across potentiometer 52 between the zero position and upper limit position of contact 51 should be equal to the load cell voltage representative of 25,000 lbs. The amount of voltage drop occuring across the balancing potentiometer may be controlled by adjusting the value of resistor 236 and by adjusting the energizing voltage, the latter adjustment being effected by varying resistors 71 and 74. Resistors 71 and 74 also control the energization of the range resistors. Since the network including resistors 240, 242, 244, 246, 248 and 250, is in parallel with the network of potentiometer 52 and resistors 234, 236 and 238, the same energizing voltage is applied to each network. The value of the energizing voltage and the value of the range resistors are so selected that each range resistor has a voltage drop thereacross equal to the load cell voltage representative of one weight range. In the example used thus far, the value of range resistors 242, 244, 246 and 248 is selected and the energizing voltage is adjusted by means of resistors 71 or 74, depending on the weight measurement units to be indicated, so that the voltage drop across each range resistor is equal to the load cell voltage representative of 20,000 lbs. Stated another way, the voltage drop across each range resistor is representative of 400 scale graduations.

After the voltage drop across the range resistors is properly adjusted, resistor 236 may then be adjusted to create the proper voltage drop across potentiometer 52, without any effect on the range resistor network. As is the case with tare bridge 20, it may be desirable to use a potentiometer in which the mechanical stop for the zero position of contact 51 is displaced from the true electrical-zero of the resistance. It is important to note that even with such a potentiometer, the zero position of contact 51 is not altered or displaced when the balance bridge is supplied with different energizing voltages. Such a displacement of the zero position of contact 51 must not be present in the balance bridge, because the bridge is variously energized when in operation, by closing or opening switch 76 to permit the scale to read in say, kilograms or pounds, respectively. Of course, if other units were to be indicated, the voltage energizing the balance bridge would be of several different values.

When contact 51 is at its zero position, contact 252 of range switch 262 must also be at the same potential as the contact 51. If the zero position of the contact 51 were at the exact end of the resistance of potentiometer 52, contact 252 may be maintained at the same potential as contact 51 by making resistor 240 equal in value to the equivalent resistance of the parallel arrangement of potentiometer 52 and resistors 234 and 236, assuming the same value of current flow through the range resistors and through the networks including potentiometer 52 and resistors 234, 236, and 238. When, however, potentiometer 52 has a certain resistance between its end and the zero position of contact 51, the voltage drop that occurs across this resistance must be compensated.

In our scale arrangement it is desirable to have slider or contact 51 reach the zero position before it reaches the mechanical stop on the potentiometer, or reaches the end of the resistance of the potentiometer. It has been found advisable to displace the zero position a distance equivalent to the chord space on front chart 286, to allow the pointer 288 to fall back of the zero mark on chart 286 a distance equal to the chord space for purposes of adjustment, if necessary. In other words, contact 51 is so positioned that the voltage drop along potentiometer 52 between the zero position of the contact and the end of the potentiometer, is equivalent to the number of chart graduations in the chord space of the front chart, and therefore, equivalent to the load cell voltage required to displace pointer 288 a distance equal to the chord space.

Thus, resistor 240 is not made equal to the equivalent resistance of the parallel arrangement of potentiometer 52 and resistors 234 and 236, but is slightly reduced in value. Since the current flow through the range resistors may be established, it is only necessary to reduce the above mentioned equivalent value of resistor 240 by an amount of resistance, when with the range resistor current flowing therethrough would cause a voltage drop equal to the voltage drop between contact 51 at its zero position and the end of potentiometer 52 connected to resistor 238. Resistor 250 is made equal in resistance to the amount by which the equivalent resistance of resistor 240 was reduced, so that the predetermined voltage drop is maintained across all of the range resistors. Thus, any load cell voltage present at contact 51, when it is in its zero position, will also appear at contact 252 and pass to the amplifier. As contact 51 is moved away from its zero position toward a position of balance, the potential on contact 252 will gradually diminish to reduce the input to the amplifier.

If the load cell voltage is sufficiently large to operate the range changing mechanism to weigh in the second range, switch blade 216 will be moved into engagement with contact 254 to insert resistor 242 into circuit with the amplifier input and reduce the unbalance voltage by an amount equal to one range. In the case of the 100,000 lb. scale previously referred to, resistor 242 reduces the unbalance voltage by an amount equivalent to 20,000 lbs. (400 scale graduations). Of course, if the cell voltage is larger such as to cause weighing in higher ranges, one or more of range resistors 244, 246 and 248 would become effective, each resistor then reducing the load cell voltage an amount equivalent to 20,000 lbs.

Even with range resistors added, the potential of blade 216 will be equal to the potential on contact 51 less a fixed amount of voltage for every range resistor that is effective.

One of the important advantages attendant to providing several ranges is that the "resolution" of the electrical system is increased. This can be demonstrated by using as an example, the 100,000 lbs. scale having five ranges. Basically, in our aforementioned copending applications, an unknown voltage from the load cell is balanced by a known voltage provided from a potentiometer in the balance bridge. The potentiometer may be of the slidewire type having a fixed length. Each position of the movable contact determines the amount of balancing voltage, and hence the position of contact 51 is an indication of the weight. Assume by way of example that the potentiometer has a length of 30". Then for a 100,000 lb. scale with 50 lb. graduations to divide the length into 2,000 equal parts, each .015" on the potentiometer is equal to 50 lbs. Thus the movable contact of the potentiometer must be accurately positioned on the potentiometer to .015", to achieve a weight reading accurate within 50 lbs. Since no mechanical system can be perfect, it is extremely difficult to meet these requirements.

However, by establishing ranges it is possible to achieve the desired accuracy without encountering the extremely close positioning requirements. In the 100,000 lbs. scale used in this application as an example, the entire length of the potentiometer is used to balance off only 25,000 lbs. of load cell voltage. Then for a potentiometer of 30" the movable contact need only be positioned to an accuracy of .060". By automatically switching into circuit the range resistors, the potentiometer still controls the final balancing in all of the ranges. Regardless of the capacity of the weighing system, the resolution of the electrical system is greatly improved by utilizing the range changing concept.

The control circuit 218 of the weighing system is shown in schematic form in Fig. 2. A master control switch 298 is provided to energize all of the electrical equipment in the weighing system. When this switch is closed, an indicator light 300 will be illuminated and all of the current supplied to the electrical system will pass through a safety fuse 302. Thus conductor 304 at the top of the control circuit, and conductor 306 at the bottom of the control circuit will be connected to supply leads 69, which may be a 110 volt circuit. Another conductor 308 is also connected to the supply voltage when switch 298 is closed.

Hold switch 78 has one terminal connected to conductor 308. As previously explained, when the hold switch is closed the power winding 68 of indicator motor 24 is energized through leads 70. In series with the hold switch and power winding is a phase shifting condenser 310 and normally closed relay contacts 312' of relay coil 312. For the present it is only necessary to note that contacts 312' are only open when the printer is operating. This prevents the indictor motor 24 and printer motor 101 from concurrently operating to jam the printer mechanism. Thus, when the hold switch is closed to supply current to the power winding, motor 24 is conditioned to follow the load on the scale and operate to bring the electrical system into balance. On the other hand when the hold switch is opened, current will not be supplied to the power winding from conductor 308, and the motor 24 cannot operate. In this condition indicator 26, movable contact 51, and printer 29 will hold their positions. In other words, adding or taking away load on the platform scale will not cause an indication of the new load until the hold switch is closed.

It is to be noted that the power winding of motor 24 may be energized independently of hold switch 78. Normally open contacts 314' of relay coil 314 and normally open contacts 316' of relay coil 316 each are connected between conductor 304 and the power winding. Whenever either of these contacts are closed, the power winding will be energized, assuming contacts 312' are closed. Energization of coil 316 is controlled by a push-button switch 318 connected between conductor 308 and the coil 316. When the weigh switch 318 is closed, current will flow from conductor 308 through coil 316 to conductor 306 and energize the coil to close contacts 316'. This energizes motor 24 to bring the electrical system into balance to indicate the correct load and condition the printer to record that load. Thus whenever the weigh switch is closed, the system will come to balance to indicate the particular load on the scale platform independently of the hold switch position.

To enable the scale system to weigh a particular load without holding the weigh switch 318, throughout the time the electrical circuit is coming to balance, a holding circuit is provided to maintain coil 316 in an energized state after the weigh switch is only momentarily closed. Normally open contacts 316" and contacts 320' of coils 316 and 320, respectively, are in series with coil 316 between conductors 304 and 306. When contacts 316" and 320' are closed, coil 316 remains energized. Contacts 316" are closed when the weight switch 318 is closed to energize coil 316. Contacts 320' are closed by coil 320 whenever the electrical system is out of balance. Coil 320 is in series with a unidirectional conductor 322, resistor 324, and contacts 326 of the balance detector 33. The balance detector, as described in our copending application, Serial No. 274,166, filed February 21, 1952, holds contacts 326 closed, whenever an unbalance voltage is present in the output circuit of amplifier 23, and when the unbalance voltage is reduced to zero, i.e. the system is balanced, contacts 326 are opened. As a result, coil 320 is energized whenever the scale system is not in balance, to close contacts 320' and de-energized to open contacts 320' when the scale system is balanced.

Hence, momentarily closing weigh switch 318 will energize coil 316 to close contacts 316" and hold the coil energized so long as an unbalance voltage exists. Also coil 316 then holds contacts 316' closed to energize motor 24 and cause it to bring the circuit into balance. Once the circuit is balanced, contacts 326 open to de-energize coil 320 and open contacts 320'. This in turn de-energizes coil 316 to open contacts 316' and place motor 24 under the control of hold switch 78. From the foregoing it should be appreciated that the scale system may be brought to balance to indicate the scale loading by momentarily pressing weigh switch 318. After the system balances, if the hold switch 78 is open, the particular weight indication will be retained on the indicator 26, even though the load on the scale platform be altered. If the hold switch is closed, the scale system will rebalance whenever the load is changed.

As previously mentioned, motor 24 may also be energized by closing normally open contacts 314'. The energization of motor 24 by contacts 314' to bring about a balance is initiated by closing the print switch 118. Before describing the particular operation of the circuit, it is well to note that momentarily closing the print switch brings about several results. In sequence it energizes the indicator motor 24 to bring the scale to balance, operates the printer 29 when the scale system is at balance, and returns the indicator motor to the influence of hold switch 78. Print switch 118 is a gang-switch having switch blades 328 and 330 for closing separate circuits. Closing switch 118 energizes coil 314 from conductors 306 and 308 to close contacts 314' and energize indicator motor 24. Thus the indicator motor is free to bring the scale system into balance. At the same time coil 314 closes cotnacts 314" which are in series with coil 314 and normally closed switch 332 of printer 29 between conductors 304 and 306. By this means coil 314 remains energized even after print switch 118 is opened. Since the scale is assumed to be unbalanced when the print switch was closed, contacts 326 of balance detector 33 will be closed to energize coil 320 as previously explained. The current flow through coil 320 opens the normally closed contacts 320" in series with coil 312 and normally closed contacts 334'. Contacts 334' are associated with coil 334 of the range changing portion of the control circuit to be described presently. Since coil 312 is thereby de-energized, contacts 312" in series with print motor 101 will be opened. This renders the print motor inoperative.

When the scale system comes to balance, contacts 326 of balance detector 33 will be opened to deenergize coil 320. Thus contacts 320" in series with coil 312 are closed to energize this coil. The current flow through coil 312 causes contacts 312" to close, and the print motor is supplied with current from conductor 304 via contacts 332 of printer 29 and contacts 314" and 312". As soon as coil 312 is energized, contacts 312' in series with the powerwinding 68 of indicator motor 24 are opened. As previously explained, this prevents any movement in the indicator 26 and printer 29 when the printer is being operated. The printer is adapted and arranged to momentarily open contacts 332 near the end of the printing cycle. When this happens, coil 314 is deenergized to open contact 314" and break the holding circuit for that coil. Since print motor 101 is connected in parallel with coil 314, no voltage will then be present to operate the motor, and it stops.

It is frequently desirable to have the sensitivity of the balance detector so adjusted that approximately two scale graduations of load must be applied or taken from the scale platform before the unbalance voltage in the amplifier will cause contacts 326 of the detector to be opened. In other words, if the scale system is at balance and a load less than two scale graduations was added or subtracted and the print switch closed, the printer would go into operation before the scale system was balanced, because the contacts of the balance detector would not close to energize coil 320 and hold the print motor inoperative.

To prevent this, switch blade 330 of the print switch 118 closes a circuit between conductor 308 and coil 320 before switch blade 328 energizes coils 314 and 312 and print motor 101. Thus even though contacts 326 of the balance detector remain open, coil 320 is energized to open contacts 320" and thereby prevent coil 312 from being energized. Since coil 312 is not energized, contacts 312" stay open and motor 101 may not be instantly operated. Connected in parallel with coil 320 is a condenser 336 which tunes the coil to provide a tank circuit. Hence, when blade 330 of the print switch is closed only momentarily and then immediately released, a current will continue to flow in this tank circuit and maintain coil 320 sufficiently energized for a short period of time to hold open contacts 320". Therefore, coil 312 will remain deenergized and maintain contacts 312" open a sufficient period of time to permit the scale mechanism to assume a new balance at a weight spaced two or less graduations from the prior weight reading before the print motor can become active. It is to be noted coil 320 and condenser 336 prevent energization of the print motor 101, when the scale system only passes through a balanced condition, and prevents energization of the print motor for a short time after the scale system comes to balance, in the same manner as the delay circuit of the balance detectors shown in our copending application Serial No. 274,166, filed February 21, 1952.

Referring to the lower right-hand corner of Fig. 2, it will be noted that range motor 210 is essentially connected in parallel with indicator motor 24. Thus the range motor is capable of being energized whenever the indicator motor is energized. However, range motor operation is also controlled by a plurality of switches now to be discussed. Conductor 338 is connected with a lead 70 of the indicator motor-power winding 68, so that conductor 338 is supplied with voltage whenever the indicator motor is energized. Range motor 210 is a conventional motor having a pair of windings 340 and 342 interconnected by a capacitor 344. When winding 340 is supplied with current, the motor will operate in a direction to add a range resistor in the electrical circuit of the scale, and when winding 342 is energized, the motor operates to remove a range resistor.

As previously indicated, if the weight on the scale platform requires the scale system to weigh in a higher range, the indicator motor drives the indicator into the overlap portion of the chart. This closes ranges-on switch 290, which may be a microswitch operated by a cam on the shaft of pointer 288. When switch 290 closes, current is fed through winding 340 between conductors 338 and 306 to drive the range motor 210 in a direction to add a range resistor. The drive mechanism between motor 210 and switch blade 216 of range switch 262 is adapted to close a holding switch 346 the instant motor 210 starts rotation. Switch 346 is connected to the movable contact 348 of relay coil 334. Movable contact 348 is biased to engage fixed contact 350, which is connected by lead 352 to winding 340. Coil 334 is deenergized whenever the indicator is disposed to require range resistor addition, as will later appear. Therefore, once switch 290 is closed to energize motor 210, holding switch 346 will close and maintain the energization of the motor, until at least one range resistor has been added. As motor 210 completes sufficient rotation to add one range resistor, holding switch 346 is opened by the drive mechanism. If the indicator has backed out of the overlap space on the indicator chart to show that no other range resistors are to be added, ranges-on switch 290 will also be opened. Thus, neither switches 290 nor 346 will be closed and motor 210 is completely deenergized. If, on the other hand, the indicator remains in the overlap space to show that more range resistors are to be added, switch 290 will remain closed to continue the energization of motor 210 and actuate switch 346 for another cycle of operation to add another range resistor. Thus range resistors are added in a step by step manner until pointer 288 backs out of the overlap space to indicate that no more range resistors are needed to permit the scale system to come to balance.

If the conditions of weighing are such that it is necessary to remove range resistors, a different set of swichtes and relay coil 334 come into play. Ranges-off switch 296, which may for example be of the cam-controlled microswitch type, is connected in series with a normally closed zero limit switch 354 and coil 334 between conductors 338 and 306. If the unbalance voltage fed to the indicator motor is phased to demand that pointer 288 move in a reverse direction, such as when the load is removed from the scale platform, the indicator motor will drive pointer 288 behind its zero position. When the pointer is driven behind zero, ranges-off switch 296 is closed to energize coil 334. The coil then closes normally open contacts 334" in series with winding 342 to start range motor 210 rotating in a direction to remove a range resistor. Also, movable contact 348 is drawn downwardly into engagement with fixed contact 358 to establish a holding circuit for coil 334 through holding switch 346, which is closed when the range motor starts operation.

After the first range resistor is removed, holding switch 346 will open. If pointer 288 has moved forward beyond its zero position to indicate that the scale system can come to balance without removing more range resistors, ranges-off switch 296 will open and deenergize coil 334. This opens contacts 334" to stop the operation of motor 210. But if pointer 288 remains back of zero to indicate that more range resistors must be removed to permit balance of the system, switch 296 remains closed and causes coil 334 to hold contacts 334" closed. Thus motor 210 remains energized to remove another range resistor.

From the foregoing it should be appreciated that range resistors will be added to or removed from the circuit automatically as weighing conditions require. It is important to note that once range motor 210 starts operation, either to remove or add a range resistor, a holding circuit is closed to insure that the range motor will operate long enough to completely remove or add a range resistor, and that the range motor will not stop operation until switch blade 216 engages one of the contacts 252, 254, 256, 258 or 260. As previously pointed out coil 334 has contacts 334' in series with coil 312. Whenever coil 334 is energized contacts 334' are opened and it is therefore impossible for print motor 101 to be energized, when range resistors are being removed from the circuit.

Contacts 334' serve the important function of preventing the printing of an incorrect record, when the scale system has momentarily come to balance in the chord space. Switch 354, which is in series with coil 334, is adapted to be opened and closed in conjunction with the movement of switch blade 216 of range switch 262. Switch 354 is closed when blade 216 is moved from contact 252 to 254 of the range switch in a direction to add range resistor 242 into the circuit, and remains closed whenever one or more of the range resistors are effective. Switch 354 opens only after blade 216 of the range switch passes from contact 254 to contact 252 to remove the first range resistor 242.

The manner in which printing of a weight is prevented when the scale is in balance in the chord space, can best be understood by citing an example. Assume that the 100,000 lbs. scale, hereinbefore used as an example, is loaded with 40,100 lbs. To achieve balance, the first range resistor 242 is rendered effective and at the same time zero-limit switch 354 is closed. The system will be in balance with an opposing voltage representative of 20,000 lbs. provided by range resistor 242 and an opposing voltage representative of 20,100 lbs. provided by potentiometer 52 in the balance bridge. Assume further that this reading is held by opening hold switch 78 and the next load of 19,900 lbs. is placed on the scale platform.

When the print switch 118 is closed, indicator motor 24 will rotate pointer 288 two graduations behind zero (100 lbs. behind zero). At this point the electrical system is actually in balance. The balance is achieved by balancing out 20,000 lbs. in range resistor 242 and a negative 100 lbs. in potentiometer 52. Since the system is in balance, printer motor 101 would ordinarily operate. However, at the same time ranges-off switch 296 is closed and zero-limit switch 354 will be closed, since blade 216 of the range switch is out of engagement with contact 252. Thus coil 334 will be energized to open contacts 334' and maintain the print motor inoperative while range resistor 242 is effectively removed from the circuit. Because there is a slight time interval required for the range motor to remove a range resistor, the print motor would otherwise go into action first, whenever a balance occured in the chord space. However, with the arrangement described, the printer is rendered inoperative while a range resistor is being removed and a state of unbalance returns to the weighing system. It should be understood that the same condition of balance in the chord space could occur between each of the ranges, and the above described circuit is equally effective to prevent the printing of an erroneous record under any of these conditions of balance.

In the first range, i.e. no range resistors effective, the range mofor 210 cannot operate in a direction to remove range resistors. This is prevented by zero-limit switch 354. As previously mentioned, switch 354 is opened when blade 216 of range switch 262 moves between contacts 254 and 252, and is retained open so long as the blade engages contact 252. Thus whenever the weighing system is disposed to weigh in the first range, switch 354 is held open and coil 334 cannot be energized to operate the range motor in a range-removing direction.

From the foregoing description of control circuit 213, it should be understood that the weighing system is capable of several modes of operation. Provision is made for automatically conditioning the electrical circuit, indicator and printer to balance, indicate and record in any one of several ranges. A hold switch is provided by means of which the weighing system may be selectively rendered operative to cause the indicator to follow the load on the scale platform and bring the weighing system to balance. When the hold switch causes the indicator to follow the load, a printed record at the next balanced condition may be obtained by momentarily closing the print switch. When the hold switch renders the indicator incapable of following the scale loading, either the print switch or weigh switch may be momentarily closed to bring the system into balance for the load then present. If the print switch is used the weighing system will be brought to balance in the appropriate range and a printed record of the load will be provided, or if the weigh switch is used, the system will be brought to balance in the proper range and the indicator will show the load conditions. Thus the print and weigh switch control the entire electrical system as well as the range changing apparatus. It will of course, be appreciated that the manner in which the print, weigh, and hold switches are operated will depend on the type of weighing to be done.

Having now described and illustrated our invention, what we desire to claim and secure by Letters Patent is:

1. In a weighing scale system, means for producing a control voltage representative of the net and tare weight imposed on the scale system, a tare bridge including a potentiometer having a movable contact dividing said potentiometer into two legs of said bridge, a mechanical stop for said contact to prevent said contact from reaching one end of said potentiometer and thereby to provide a certain resistance value between said one end of said potentiometer and said contact when positioned against said mechanical stop, a pair of resistors having a terminal therebetween and forming the other legs of said bridge, one of said resistors having a resistance equal to said certain resistance of said potentiometer and the other of said resistors having a resistance equal to the resistance of the remainder of said potentiometer, an energizing circuit to supply current flow through said resistors and potentiometer, said contact and said terminal having the same potential when said contact is disposed against said mechanical stop and having a tare voltage developed therebetween when said contact is displaced from said mechanical stop, means to position said contact to produce a tare voltage representative of tare weight imposed on the scale system, voltage responsive weight indicating means, and circuit leads connecting said control voltage producing means to said weight indicating means between said contact and said terminal with said tare voltage in opposition to said control voltage, said control voltage being reduced by the tare voltage to produce a voltage representative of net weight on the scale system.

2. In a weighing scale system, means for producing a control voltage representative of the net and tare weight imposed on the scale system, a tare bridge including a potentiometer having a movable contact dividing said potentiometer into two legs of said bridge, a mechanical stop for said contact to prevent said contact from reaching one end of said potentiometer and thereby to provide a certain resistance valve between said one end of said potentiometer and said contact when positioned against said mechanical stop, a pair of resistors having a terminal therebetween and forming the other legs of said bridge, one of said resistors having a resistance equal to said certain resistance of said potentiometer and the other of said resistance having a resistance equal to the resistance of the remainder of said potentiometer, an energizing circuit to supply current flow through said resistors and potentiometer, means for varying the current flow through said resistors and potentiometer, said contact and terminal having the same potential when said contact is disposed against said mechanical stop irrespective of the current flow through said resistors and potentiometer and having a tare voltage developed therebetween when said contact is displaced from said mechanical stop, means to position said contact to produce a tare voltage representative of tare weight imposed on the scale system, voltage responsive weight indicating means, and circuit leads connecting said control voltage producing means to said weight indicating means between said contact and said terminal with said tare voltage in opposition to said control voltage, said control voltage being reduced by the tare voltage to produce a voltage representative of net weight on the scale system.

3. In a weighing system, means producing a control voltage representative of the load on the system, circuit means providing a balancing voltage in opposition to said control voltage, said balancing voltage being composed of a variable voltage and a range voltage, a motor operable to add or subtract said range voltage from said balancing voltage, an energizing circuit for said motor, means in said energizing circuit responsive to said control voltage to operate said motor and add said range voltage when said control voltage exceeds a predetermined value, means in said energizing circuit responsive to said control voltage to operate said motor and subtract said range voltage when said control voltage falls below another predetermined value, and a holding circuit to maintain said motor in an operative condition until the motor has completely added or subtracted said range voltage.

4. In a weighing system, means producing a control voltage representative of the load on the system, circuit means providing a balancing voltage in opposition to said control voltage, said balancing voltage being composed of a variable voltage and a range voltage, a motor operable to add or subtract said range voltage from said balancing voltage, an energizing circuit for said motor, a first switch in said energizing circuit operable responsive to said control voltage to operate said motor and add said range voltage when said control voltage exceeds a predetermined value, a second switch in said energizing circuit closed by operation of said motor to maintain said motor operative independently of said first switch, and means to open said second switch when said motor has operated to add said range voltage to said balancing voltage.

5. In a weighing system, means producing a control voltage representative of the load on the system, circuit means providing a balancing voltage in opposition to said control voltage, said balancing voltage being composed of a variable voltage and a range voltage, a motor operable to add or subtract said range voltage from said balancing voltage, an energizing circuit for said motor, a first switch in said energizing circuit operable responsive to said control voltage to operate said motor and add said range voltage when said control voltage exceeds a predetermined value, a second switch in said energizing circuit operable responsive to said control voltage to operate said motor and subtract said range voltage when said control voltage falls below another predetermined value, and means to maintain said second switch in closed condition to operate said motor until said range voltage is subtracted from said balancing voltage.

6. In a weighing system, means producing a control voltage representative of the load on the system, circuit means providing a balancing voltage in opposition to said control voltage, said balancing voltage being composed of a variable and a range voltage, a motor operable to add or subtract said range voltage from said balancing voltage, an energizing circuit for said motor, a first switch means in said energizing circuit closed to operate said motor and subtract said range voltage, relay means energizable to close said first switch means, second switch means to energize said relay means when said control voltage falls below a predetermined value, means to retain said relay means in an energized condition until said range voltage is subtracted from said balancing voltage, and means to render said second switch means ineffective to energize said relay means when said range voltage is subtracted from said balancing voltage.

References Cited in the file of this patent
UNITED STATES PATENTS

| | | |
|---|---|---|
| 1,163,678 | Messiter | Dec. 14, 1915 |
| 1,298,302 | Davis | Mar. 25, 1919 |
| 1,859,814 | Wyckoff | May 24, 1932 |
| 2,101,296 | Simpson et al. | Dec. 7, 1937 |
| 2,103,618 | Haegele | Dec. 28, 1937 |
| 2,217,639 | Luhrs | Oct. 8, 1940 |
| 2,400,190 | Clark | May 14, 1946 |
| 2,460,798 | McCarthy | Feb. 8, 1949 |
| 2,464,057 | Phair | Mar. 8, 1949 |
| 2,592,009 | Clement | Apr. 8, 1952 |
| 2,606,943 | Barker | Aug. 12, 1952 |
| 2,610,052 | Macgeorge | Sept. 9, 1952 |
| 2,616,683 | Le Fevre | Nov. 4, 1952 |
| 2,630,007 | Howe | Mar. 3, 1953 |
| 2,637,619 | Stein | May 5, 1953 |
| 2,638,780 | Holford | May 19, 1953 |
| 2,653,308 | Allen | Sept. 22, 1953 |
| 2,656,498 | Goodwin | Oct. 20, 1953 |
| 2,661,260 | Salzman | Dec. 1, 1953 |
| 2,680,012 | Bozoian | June 1, 1954 |
| 2,683,030 | Caule | July 6, 1954 |
| 2,723,844 | Thurston | Nov. 15, 1955 |
| 2,766,981 | Lauler et al. | Oct. 16, 1956 |
| 2,812,170 | Kennedy | Nov. 5, 1957 |
| 2,817,810 | Sontheimer | Dec. 24, 1957 |